July 31, 1962
D. L. TAYLOR ETAL
3,047,300
METAL SEALING ASSEMBLY
Filed July 1, 1959
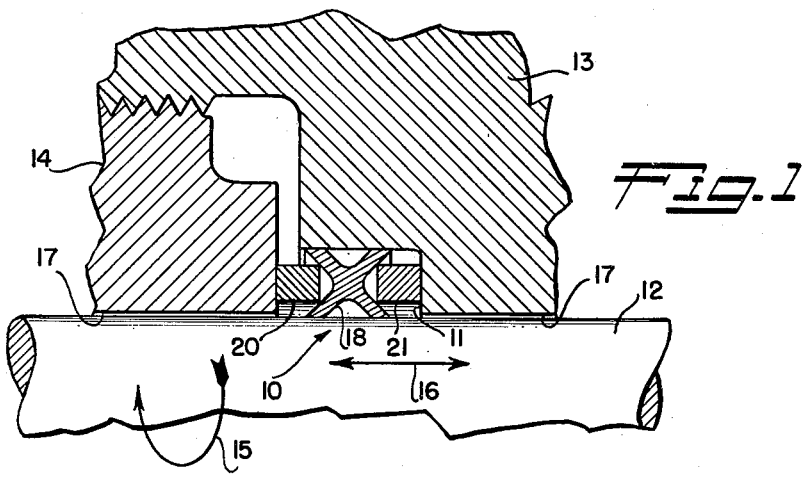
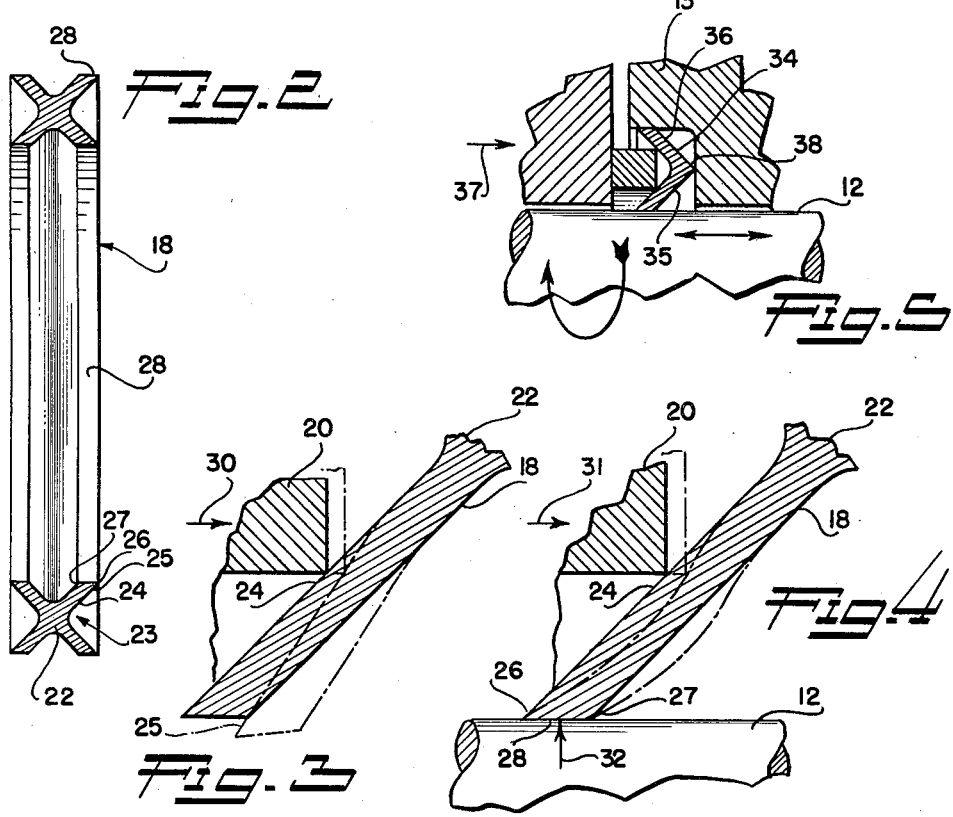
INVENTORS
DONALD L. TAYLOR
DOUGLAS G. THOMPSON
By *George C. Sullivan*
Agent

United States Patent Office 3,047,300
Patented July 31, 1962

3,047,300
METAL SEALING ASSEMBLY
Donald L. Taylor, Glendale, and Douglas G. Thompson, Los Angeles, Calif., assignors to Lockheed Aircraft Corporation, Burbank, Calif.
Filed July 1, 1959, Ser. No. 824,341
5 Claims. (Cl. 277—102)

The present invention relates to devices for effecting sealing between relatively moving members or relatively stationary members and relates more particularly to a metal sealing assembly adapted for use in connection with members that are slideably and/or rotatably disposed relative to each other and with members which are stationary with respect to each other.

While attempts have been made in the past, for a considerable period of time, towards the provision of adequate sealing arrangements between relatively moving, generally annular members, contemporary requirements have dictated the need for a sealing assembly that will operate effectively in many situations and especially in instances where temperature changes, high pressure, thin-walled structures and the like are encountered. Prior are devices intended for a similar purpose have taken the form of split sealing rings, as for example, those used in reciprocating engines, chevron type packings and/or sealing rings that are also usually split, O rings of metal, rubber or other soft materials and the like. Each of these prior structures has presented serious difficulties in particular situations and has failed to be effective in the performance of the desired sealing action under all conditions of use.

For example, piston rings rely for their effectiveness upon the split opening through which fluids may escape. Obviously, this type of sealing arrangement would be ineffective in hydraulic cylinder applications or accumulators where high pressures must be held or in situations where fluids must be constantly maintained at a constant pressure level without pressure loss or leakage.

Chevron type sealing rings or packing also have serious disadvantages relative to the necessity of splits, slots or openings in the peripheries thereof and further relative to the generally soft material utilized in such structures and the deformation action thereof. Here again, considerable wear and permanent sets are encountered preventing use thereof in high pressure situations. The rubber or like chevron type packings and O ring type seals are also ineffective under extreme temperature situations wherein deterioration due to the presence of heat and/or cold result in ineffective sealing.

O ring and/or reed type seals have been deficient when attempts are made to use them in high pressure systems at elevated temperatures. For example, O ring seals which contain elastomeric materials are not heat resistant above or below a medium temperature range compatible with hydraulic fluids at high temperatures while the reed seals have unacceptable leakage rates at high pressures and are subject to short wear life.

Other difficulties have been encountered when employing conventional sealing devices since it is preferable to employ some type of resilient material as a spring member applied against the gland and the seal in order to insure that the seal maintains constant contact with the sealing surface.

It has also been found desirable to have a preload on sealing devices so that as wearing on the movable member occurs the minute spaces or openings represented by the wear are taken up by the seal. Consequently, elaborate assemblies have been known in the prior art which employ springs or the like for preloading the seal.

Due primarily to recent developments in connection with aircraft, missiles, rockets and in other fields wherein high pressure, high temperature, low temperature and other environmental conditions such as radiation are encountered it has become necessary for the provision of a new type of sealing assembly which will meet these composite requirements and still be relatively light in weight, require relatively inexpensive and light in weight supporting arrangements, and enable use in all sealing situations.

In according with the present invention, the above difficulties are obviated by means of an all metal foliate seal assembly which comprises, in general, a metal ring of X cross section, in one embodiment disposed between the movable member, either rotary and/or sliding, and the gland securing nut and having a pair of annular loading rings of square cross section arranged on opposite sides of the annular ring which when they are properly installed are preloaded into engagement about the knee of each leg of the ring so that the legs of the ring deform to overcome any clearances or tolerances existing between the sealing surfaces of the sealing ring and the movable element.

Therefore, it is an object of the present invention to provide a loaded seal which will accommodate radial wear of a movable element so that leakage between the seal and the movable element is reduced to a minimum over prolonged periods of operation.

Another object of the present invention is to provide a metal sealing assembly which produces a resultant sealing force at the shaft or movable element contact point to effect efficient sealing.

Another object of the present invention is to provide a metal seal assembly which maintains seal leakage at a minimum thereby avoiding rapid collapse of the seal over prolonged usage. Seal leakage, when it occurs, is progressive and a function of wear time and, therefore, seal breakdown is never catastrophic in the present invention. Safety value of such a seal as the present invention is obvious when the propensity towards catastrophic failure of conventional elastomeric seals is considered.

Another object of the present invention is to provide an all metal seal which is self-compensating to maintain seal leakage at a minimum and which avoids the necessity for repeated replacement of the sealing assembly. The only remedy for a leaking elastomeric seal is replacement. The remedy for a leaking seal of the present invention is provided by an easily accessible adjusting nut. The saving in maintenance time due to the avoidance of costly dismantling and reassembly in service is great.

Still another object of the present invention is to provide an all metal seal which is unaffected by aging. Because the present invention is made of metal, the seal is comparatively unaffected by aging, consequently its reliability is not affected in the systems which are required to stand in an inoperative condition for protracted periods of time.

A still further object of the present invention is to provide a new and improved metal seal which is employed in high pressure system operable at high and/or very low temperatures.

Other and further objects of the invention will become apparent from the disclosures in the following detail specification, appended claims and accompanying drawings wherein:

FIGURE 1 is a cross sectional view of an over-all sealing gland incorporating the sealing assembly of the present invention;

FIGURE 2 is a cross section of the metal seal per se employed in the sealing assembly of FIGURE 1;

FIGURE 3 is an enlarged cross sectional view of a loading ring and one leg or foil of the seal in an unrestricted application;

FIGURE 4 is an enlarged sectional view of a loading ring and a leg or foil of the seal in a restricted and loaded application; and FIGURE 5 is a cross sectional view of another embodiment of an over-all sealing assembly incorporating the present invention.

With reference to FIGURE 1, a typical embodiment of the present invention employing a metallic sealing assembly is shown. FIGURE 1 shows a sealing assembly 10 located in a chamber 11 provided in the gland for the assembly. The gland comprises a gland body 13 and an adjusting nut 14 which is threadably engaged with the gland body to define chamber 11. Movable element 12 may take many forms, however, in the present instance, movable element 12 is shown as a shaft which is adaptable for rotation in accordance with arrow 15 or longitudinal displacement in accordance with arrow 16. Therefore, it is contemplated that the present invention may be employed for either static or dynamic sealing purposes.

The diameter of a bore 17 provided in both nut 14 and body 13 is of slightly greater diameter than the diameter of the shaft so that the nut and body may be easily slid over the periphery of the shaft.

Sealing assembly 10 comprises, in one form of the invention, a metal sealing ring 18 disposed between a pair of annular metal loading rings 20 and 21 of square cross section. Each loading ring is disposed between either the nut 14 or the body 13 and one side of the sealing ring 18. The rings are shown as separated and individual members but, if desired, these members may be integrally formed in the nut or gland body. With respect to FIGURE 2, the sealing ring 18 is shown to comprise a central body portion 22 and a plurality of legs 23 integrally formed with body 22 and radiating outwardly therefrom. The general cross section of the ring takes the form of an X. Sometimes the legs are referred to in common practice as foils or the ring of this configuration is sometimes generally known as a quatrefoil seal. It is to be noted that each leg 23 includes a knee 24, and a foot 25 having a toe 26 and a heel 27. While it is preferred to show a toe and heel, it is to be understood that any suitable configuration may be employed such as for example, pointed, chiseled or rounded. The quatrefoil seal is preferably made from a highly resilient metal, such as stainless steel, with or without a wear resistant plating, as tungsten carbide flame plating for example. This material and plating provides the surface of the seal ring with a highly polished smooth hard and durable surface finish. It is noted that each foot of a leg or foil 23 includes an annular sole 28 which defines the inside diameter of the seal and the outside diameter. Also, it is to be appreciated that the width of the ring 18 has its periphery defined by the length of the leg terminating in the toe 26.

With respect to FIGURES 3 and 4, the principles of the sealing action of the present invention are illustrated. For example, in FIGURE 3 an enlarged fragmentary view of the sealing assembly is shown wherein sealing ring leg 18 is urged in the direction of arrow 30 against the knee 24. When the leg is in an unrestricted application, both the loading ring 20 and the leg 18 result in the configuration shown in broken lines of FIGURE 3. In this configuration it is noted that the foot 25 of leg 18 drops down below the normal plane of the foot sole 28 shown in solid lines before force is applied by the loading ring in the direction of arrow 30. This action is primarily a result of bending loads developed between the knee 24 and the main body section 22 of the sealing ring. It can therefore be appreciated that the legs of the sealing ring are deflected to apply the load such that bending moments are developed on each leg. The legs or foils 18 are sufficiently resilient such that upon the removal of the forces applied by the loading ring 20, the leg or foil will spring back to the position shown in solid lines.

With the above principles and actions kept in mind, FIGURE 4 shows an enlarged fragmentary view of a backup ring applying force in the direction of arrow 31 applied to the knee 24 of leg 18 when the leg is in a restricted or sealing application with respect to a movable element such as shaft 12. The sealing contact between the sole of leg 18 and the surface of shaft 12 is indicated by arrow 32. As shown in broken lines, loading ring 20 when urged in the direction of arrow 31 engages the leg about knee 24 which causes the leg to bend in the configuration shown in broken lines. The foot of the leg is restricted from inward and downward movement by the sealing contact with shaft 12 as indicated by arrow 32. Therefore, it is easily seen that as wear occurs between sole of the leg and the surface of the shaft, the resilient leg will be self-compensating. It will be appreciated that the only point of wear is represented at the sealing contact 32 and that toe 26 will wear faster than any portion of the foot associated with leg 18. Consequently, there is a differential rate of wear on the sole of the foot with more wear occurring at the toe portion and the least wear occurring at the heel. Inasmuch as a loading force in the direction of arrow 31 is applied by the loading ring 20 to the knee 24 of leg 18, any wear occurring on the sole of the foot or the shaft member will be compensated by the resiliency of the leg. In fact, as the toe wears at a greater rate than the heel, the actual sealing surface of the sole will increase as the sole of the leg becomes wider.

Although FIGURE 4 shows the action of a single leg 18 sealing against shaft member 12, it is to be understood that the other legs of the seal ring operate employing substantially the same principles and actions as described with reference to the single leg of FIGURE 4. However, in some instances it is not necessary for the two legs normally engageable with the gland body to seal against the gland body or even engage the gland body. In such instances, the backup rings operate to seal the back side of the sealing assembly while the legs engaging the shaft member effect sealing on the shaft member side of the sealing assembly. Although the loading rings are preferably shown as being square or rectangular, it can be appreciated that the loading rings may be circular in cross section with smooth or serrated surfaces.

With respect to the embodiment of the sealing assembly shown in FIGURE 5, a sealing ring 34 is provided which includes a pair of legs 35 and 36 which are annular and in size and configuration are identical to one-half of the sealing ring employed in the sealing assembly of FIGURE 1. The cross section of ring 34 is of substantially a V shape and the assembly includes a single loading ring 20 which operates to diverge the legs 35 and 36 upon the application of force in the direction of an arrow 37. Such an application of force urges the central portion 38 of the ring into forcible engagement with the body section 13 whereby the soles of legs 35 and 36 are urged into sealing contact with the gland body and the movable element 12, respectively. The principles and action of the sealing assembly as shown in FIGURES 3 and 4 are also applicable to the principles and actions of the sealing assembly embodiment shown in FIGURE 5.

In actual operation, and in reference to the embodiment of the sealing assembly shown in FIGURE 1, the sealing assembly may be passed about the periphery of member 12 to a position where sealing contact is to be effected. Normally, the inner diameter of the sealing ring is greater than the outer diameter of shaft member 12 so that the ring may be easily passed about its periphery. Likewise, the outer diameter of the sealing ring may be easily passed into the gland chamber 11. Next, loading rings 20 and 21 are positioned between adjacent legs so that upon application of pressure to the outer sides of the rings, the rings move towards one another and the associated legs will be caused to diverge so that the soles of the respective legs will come into sealing contact with the movable member 12 and the body gland 13. Force being applied in the direction of arrow 31 causes loading ring 20 to engage the knee 24 of a leg 18 which in turn causes the bending action shown in broken lines of FIGURE 4 and causing the sole 28 to engage with the movable member 12 in sealing contact. Nut 14 may be adjusted to apply more or less force in the direction of arrow 31 to control the sealing force. However, it can be appreciated that any suitable type of adjusting arrangement can be employed such a C clamp with a toggle bolt for applying axial or compressive loading to elements which cause displacement of the loading ring in the direction of arrow 31 or any other suitable type of adjusting means may be employed.

Furthermore, it is to be understood that the sealing assembly of the present invention may be used in singular fashion as shown in FIGURE 1 or may be employed in multiple assemblies in arrangements which achieve dynamic and/or static sealing. For example, the sealing assembly shown in FIGURE 1 is employed as a dynamic seal and this configuration may include a second sealing chamber in the gland body having an identical sealing assembly without employing an adjusting means, such as nut 14, for varying the sealing pressure with or without employing an adjusting means, or with separately and individually adjustable means in combination. This becomes a preferred tandem independent multiplicity of sealing members.

Although the embodiments of FIGURES 1 and 5 show the sealing assembly installed in a gland or cylinder, it is to be understood that the invention may be installed on the movable member 12, as in the case of a piston, whereby the sealing assembly would move relative to the gland or cylinder.

Having described only a typical form of the invention we do not wish to be limited to the specific details herein set forth, but wish to reserve to ourselves any variations or modifications that may appear to those skilled in the art and fall within the scope of the following claims.

We claim:

1. In combination with a pair of concentric, axially telescoped parts having adjacent concentric surfaces to be sealed against axial leakage therebetween, one of which has an open annular recess concentric with the axis thereof and facing the concentric surface of the other part to form a chamber therewith, the recess having an annular back wall and two relatively adjustable radial walls, a semi-rigid metal annular ring disposed concentrically in said chamber, said ring having a body portion of substantial radial and axial thickness and inner and outer solid, elongated, deflectable, annular legs integral with and diverging radially and axially from the body portion at the respective inner and outer radial sides thereof, said legs terminating at free ends with broad, flat, sealing surfaces, said legs forming an annular, axially opening, V-shaped channel, one of the sealing surfaces engaging the back wall, and the other such surface engaging the opposed concentric surface of the other part, and annular loading ring disposed in the channel between the inner and outer legs and one of the radial walls and engaging the legs midway between the body portion and the free ends so that movement of the radial walls toward each other produces leg flexing action to resiliently urge the whole area of each of the sealing surfaces on the free ends of the legs into sealing contact with the respective parts.

2. The invention as set forth in claim 1, wherein the rigid metal ring is of X-shaped cross section.

3. The invention as set forth in claim 1, wherein the rigid metal ring is of a V-shaped cross section.

4. In combination with a pair of concentric axially telescoped parts with adjacent concentric surfaces to be sealed against axial leakage therebetween, one of the parts having an open annular chamber concentric with the axis thereof, said chamber having a rear annular surface concentric to the adjacent surface of the other part and two relatively adjustable radial walls, a rigid metal annular ring of X-shaped radial cross section disposed concentrically in said chamber said ring having a body portion of substantial radial and axial thickness and at least one inner and one outer solid, elongated, deflectable semi-rigid leg integral with and diverging radially and axially from the body portion at the respective inner and outer radial sides thereof, said legs terminating at free ends with broad flat sealing surfaces and being spaced laterally on the ring by an annular, axially opening, V-shaped channel, said legs sealingly engaging the adjacent concentric surface of the other part and the rear surface of the chamber, and a pair of annular loading rings in the chamber and so disposed that the rings appear in the channels between the inner and outer legs, said loading rings contacting the radial walls and engaging the legs midway between the body portion and the free ends to produce leg flexing action to resiliently urge the whole area of the sealing surfaces at the free ends into sealing contact with the respective parts.

5. A dynamic seal assembly comprising: a pair of concentric, axially telescoped parts having adjacent concentric surfaces to be sealed against leakage therebetween, one of the parts having an open, annular recess concentric with the axis and facing the adjacent concentric surface on the other part, the recess having an annular back wall concentric with the adjacent surface of the other part, two radially extending axially adjustable walls adjacent the back wall which form with the back wall and the adjacent concentric surface of the other part an annular sealing chamber, a semi-rigid annular ring disposed in said chamber, said ring having an annular central body portion and a pair of solid, elongated, deflectable annular legs integral with and diverging radially and axially from the body portion so that an annular V-shaped channel is formed therebetween, one of the legs extending outwardly from the recess to engage at its free end the adjacent concentric surface, said leg at said end terminating in a broad flat sealing surface, and the other leg extending inwardly to engage the back wall at its free end in sealing engagement, an annular loading ring disposed in the annular V-shaped channel between the legs and engaging each leg midway between the body portion and the free end, said loading rings extending to a point beyond the axial extremity of the legs, said ring being associated with one of the radially extending walls of the chamber so that axial movement of the radial walls toward one another will produce leg flexing action to resiliently urge the whole area of the broad flat sealing surface into sealing contact with its respective part.

References Cited in the file of this patent

UNITED STATES PATENTS

| 1,721,325 | Wilson | July 16, 1929 |
| 2,075,947 | Kennedy | Apr. 6, 1937 |
| 2,521,692 | Costello | Sept. 12, 1950 |